United States Patent
Gester et al.

(10) Patent No.: US 10,518,429 B2
(45) Date of Patent: Dec. 31, 2019

(54) POLYMERIC CUTTING EDGE STRUCTURES AND METHOD OF MANUFACTURING POLYMERIC CUTTING EDGE STRUCTURES

(71) Applicant: The Gillette Company, Boston, MA (US)

(72) Inventors: Matthias Gester, Farnborough (GB); Roman Kiyan, Hannover (DE); Ulf Hinze, Garbsen (DE); Kestutis Kurselis, Garbsen (DE)

(73) Assignee: The Gillette Company LLC, Boston, MA (US)

( * ) Notice: Subject to any disclaimer, the term of this patent is extended or adjusted under 35 U.S.C. 154(b) by 359 days.

(21) Appl. No.: 15/188,123

(22) Filed: Jun. 21, 2016

(65) Prior Publication Data

US 2017/0001325 A1    Jan. 5, 2017

Related U.S. Application Data

(60) Provisional application No. 62/186,729, filed on Jun. 30, 2015.

(51) Int. Cl.
*B26B 21/60* (2006.01)
*B29C 37/00* (2006.01)
(Continued)

(52) U.S. Cl.
CPC .......... *B26B 21/60* (2013.01); *B26B 21/4068* (2013.01); *B26B 21/58* (2013.01);
(Continued)

(58) Field of Classification Search
CPC ..... B26B 21/58; B26B 21/60; B26B 21/4068; B29C 37/0028; B29C 2037/0035; B29C 33/3842; B29C 39/021; B29C 39/026; B29C 39/10; B29C 2045/1693; B29C 45/1866; B29C 39/44; B29C 39/028;
(Continued)

(56) References Cited

U.S. PATENT DOCUMENTS 3,035,344 A * 5/1962 Brown ...................... B26B 9/00
30/115
6,379,324 B1 * 4/2002 Gartstein .......... A61M 37/0015
604/20

(Continued)

FOREIGN PATENT DOCUMENTS

GB          2310819       9/1997
JP         2015100659     6/2015

OTHER PUBLICATIONS

PCT International Search Report with Written Opinion in corresponding Int'l Appln. PCT/US2016/038515 dated Oct. 14, 2016.
(Continued)

*Primary Examiner* — Jeffrey M Wollschlager
(74) *Attorney, Agent, or Firm* — Joanne N. Pappas; Kevin C. Johnson (57) ABSTRACT

A functional polymeric cutting edge structure and methods for the manufacturing cutting edge structures using polymeric materials are provided. A razor blade for use in a razor cartridge or a blade box for assembly in a razor cartridge frame may be formed using the present invention.

18 Claims, 8 Drawing Sheets

(51) Int. Cl.
*B29C 33/00* (2006.01)
*B29C 33/38* (2006.01)
*B29C 33/40* (2006.01)
*B26B 21/58* (2006.01)
*B29C 35/08* (2006.01)
*B29C 39/00* (2006.01)
*B26B 21/40* (2006.01)
*B29C 39/02* (2006.01)
*B29C 39/10* (2006.01)
*B29L 31/00* (2006.01)
*B29C 39/26* (2006.01)
*B29K 105/00* (2006.01)
*B29C 33/44* (2006.01)
*B29C 33/52* (2006.01)
*B29K 33/04* (2006.01)
*B29K 105/24* (2006.01)

(52) U.S. Cl.
CPC ........ *B29C 33/005* (2013.01); *B29C 33/3842* (2013.01); *B29C 33/3857* (2013.01); *B29C 33/40* (2013.01); *B29C 35/0805* (2013.01); *B29C 35/0888* (2013.01); *B29C 37/0028* (2013.01); *B29C 39/006* (2013.01); *B29C 39/02* (2013.01); *B29C 39/026* (2013.01); *B29C 39/028* (2013.01); *B29C 33/448* (2013.01); *B29C 33/52* (2013.01); *B29C 39/021* (2013.01); *B29C 39/10* (2013.01); *B29C 39/26* (2013.01); *B29C 2035/0827* (2013.01); *B29C 2035/0833* (2013.01); *B29C 2037/0035* (2013.01); *B29K 2033/04* (2013.01); *B29K 2105/0002* (2013.01); *B29K 2105/0005* (2013.01); *B29K 2105/0058* (2013.01); *B29K 2105/0094* (2013.01); *B29K 2105/24* (2013.01); *B29K 2833/12* (2013.01); *B29K 2883/00* (2013.01); *B29K 2995/0027* (2013.01); *B29L 2031/7186* (2013.01); *B29L 2031/72* (2013.01); *B29L 2031/756* (2013.01)

(58) Field of Classification Search
CPC ... B29C 39/02; B29C 33/005; B29C 35/0888; B29C 33/3857; B29C 33/40; B29C 39/006; B29C 35/0805; B29C 2035/0833; B29C 33/52; B29C 2035/0827; B29C 33/448; B29C 39/26; B29K 2883/00; B29K 2033/04; B29K 2105/24; B29K 2833/12; B29K 2995/0027; B29K 2105/0002; B29K 2105/0005; B29K 2105/0058; B29K 2105/0094; B29L 2031/756; B29L 2031/7186; B29L 2031/72

See application file for complete search history.

(56) References Cited

U.S. PATENT DOCUMENTS

| | | | |
|---|---|---|---|
| 8,858,807 B2 | 10/2014 | Devoe et al. | |
| 9,199,384 B2* | 12/2015 | Gringer | B26B 21/58 |
| 9,211,480 B2* | 12/2015 | Lu | A63H 33/009 |
| 9,463,395 B2* | 10/2016 | Lu | A63H 33/009 |
| 2005/0126016 A1* | 6/2005 | Branden | A47L 13/08 |
| | | | 30/346.54 |
| 2009/0099537 A1* | 4/2009 | DeVoe | A61M 37/0015 |
| | | | 604/272 |
| 2010/0021647 A1* | 1/2010 | Sitti | B29C 33/3842 |
| | | | 427/457 |
| 2011/0042847 A1* | 2/2011 | Ogawa | B29C 33/306 |
| | | | 264/219 |
| 2013/0008036 A1* | 1/2013 | Gringer | B29C 45/14426 |
| | | | 30/346.59 |
| 2013/0087942 A1* | 4/2013 | Kimishima | C14B 1/56 |
| | | | 264/220 |
| 2014/0066843 A1* | 3/2014 | Zhang | A61K 9/0021 |
| | | | 604/46 |

OTHER PUBLICATIONS

Jaime Werkmeister et al: "Anisotropic Etching of Silicon as a Tool for Creating Injection Molding Tooling Surfaces", Journal of Hicroelectromechanical Systems, IEEE Service Center. US, vol. 15, No. 6, Dec. 1, 2006 (Dec. 1, 2006), pages.

Brick in the Yard Mold Supply: "Mold 1.2.4,5, Making Tutorial: Cut Block Mold", 7-11 youtube. Apr. 8, 2014 (Apr. 8, 2014). p. 1 pp.

* cited by examiner

POLYMERIC CUTTING EDGE STRUCTURES AND METHOD OF MANUFACTURING POLYMERIC CUTTING EDGE STRUCTURES

FIELD OF THE INVENTION

This invention relates to shaving razors and methods of manufacturing cutting edge structures, and more particularly to manufacturing cutting edge structures such as shaving razor blades from a polymeric material.

BACKGROUND OF THE INVENTION

Razor blades are typically formed of a suitable metallic sheet material such as stainless steel, which is slit to a desired width and heat-treated to harden the metal. The hardening operation utilizes a high temperature furnace, where the metal may be exposed to temperatures greater than about 1000° C. for up to about 20 seconds, followed by quenching, whereby the metal is rapidly cooled to obtain certain desired material properties.

After hardening, a cutting edge is formed generally by grinding the blade. The steel razor blades are mechanically sharpened to yield cutting edges that are sharp and strong to cut through hair over an extended period of time. The continuous grinding process generally limits blade shapes to have straight edges with a substantially triangular or wedge shaped profile (e.g., cross section). The cutting edge wedge-shaped configuration typically has an ultimate tip with a radius less than about 1000 Angstroms.

The advantage of this prior art method is that it is a proven, economical process for making blades in high volume at high speed. It would be particularly desirable if such a process could utilize lower cost materials for blade formation and also enable cutting edge profiles other than substantially triangular.

Blades with cutting edges made from a polymeric material are disclosed for disposable cutlery or disposable surgical scalpels (e.g., U.S. Pat. Nos. 6,044,566, 5,782,852). Razor blades made from polymeric material are disclosed in GB2310819A. The disadvantage of any of the prior art polymer blades is that the process of making such plastic blades is not suitable to create a cutting edge with a tip radius of less than 1 µm as required for cutting hair.

Generally, the prior art utilizes melt flow processing techniques. The molten polymer of the prior art is injected into a cavity of a mold tool which is typically metal, but the polymer is generally too viscous (typically exceeding 100,000 centiPoise) to fully penetrate into the sub-micro-meter (e.g., less than 1 micrometer) dimensioned spaces required in a cavity to create razor blade edges. However, choosing a lower viscosity material or increasing the injection pressure, which may benefit penetration into sub-micro-meter dimensioned spaces, causes the polymeric material to penetrate between the mating surfaces of the two halves of the mould tool, known as "flashing," and therefore the required cutting edge tip radius cannot be achieved. A decrease of viscosity of the polymeric material may also be obtained by heating the polymeric raw material above the glass transition temperature, often exceeding 200° C. Furthermore, after filling the cavity, the fluid polymeric material needs to be cooled to achieve a solid state, which causes shrinkage of the blade shape and rounding of the edge and therefore the required cutting edge tip radius cannot be achieved.

Therefore, a need exists for better processes for cutting edge structures made of polymer and more cost-effective methods of making cutting edge structures for shaving razors having required tip radius, less variability in edge quality and sharpness to provide a comparable or improved shaving experience.

It is also desirable to find materials and processes that can form cutting edge structures having any shape, such as non-linear edges and/or provide an integrated assembly.

SUMMARY OF THE INVENTION

The present invention provides a simple, efficient method for manufacturing one or more cutting edge structures, such as razor blades from a polymeric material and a functional polymeric cutting edge structure such as a razor blade. Moreover, some methods are suitable for producing a plurality of such cutting edge structures, or "blade boxes" comprising a plurality of razor blades formed in a polymeric material to be disposed as a single unit in a razor cartridge.

In one aspect, the method for manufacturing at least one cutting edge structure includes providing a first polymeric material in liquid form in a container, providing at least one cutting edge template within said first polymeric material, curing said first polymeric material while said at least one cutting edge template is disposed in said first polymeric material to form a base structure, removing said template to obtain a cavity in said base structure, filling said cavity with a second material, said second material being a precursor for a polymeric material, curing said second material, and separating said base structure and said cured second polymeric material, said at least one cutting edge structure comprised of said cured second polymeric material.

Further, the second precursor material is comprised of a monomer material, an oligomer material, or any combination thereof. The at least one cutting edge structure comprises a gothic arch, a roman arch, or one or more undercuts. The tip radius of the at least one cutting edge structure is less than 1 micrometer.

In one aspect, the first polymeric material is comprised of Poly (methyl methacrylate) (PMMA) or Polydimethylsiloxane (PDMS). In a second aspect, the second precursor material is comprised of an acrylic or epoxy based materials. In another aspect, a viscosity of the second precursor material is less than about 10000 centiPoise.

In another aspect of the present invention, the base structure is only one part and the cavity is entirely comprised in a single part in the base structure. In yet another aspect, a portion of the cavity is not enclosed by the base structure after formation.

Further, at least one of the second precursor material, the cured second polymeric material and at least one side of the cavity is transparent to electro-magnetic radiation at a wavelength in the range of 250 to 1500 nanometers.

Additionally, the separating step of the present invention includes physical or chemical removal of the base structure from the cured second polymeric material cutting edge structure. In one aspect, the first polymeric material is compliant. In another aspect, the separated base structure may be reused at the filling step.

In another aspect of the present invention, a photo-initiator of about 1% to about 3% by weight of composition is added to the second precursor material prior to the curing step.

The present invention step of curing includes cross-linking or polymerization and the curing step is mediated via heat, light, such as UV light, or a combination thereof.

In still yet another aspect of the invention, the at least one cutting edge structure formed using the method herein is a razor blade or a portion of a blade box and the razor blade or the blade box is secured into a razor cartridge housing or frame. The blade box may be comprised of different types of cutting edge structures.

Another embodiment of the present invention includes a blade box comprising at least one cutting edge structure, at least one non-cutting edge structure coupled to said at least one cutting edge structure, both the cutting and non-cutting edge structures comprised of a polymeric material, the polymeric material produced by a precursor material for the polymeric material.

Another embodiment of the present invention is a razor blade including at least one cutting edge structure comprised of a polymeric material, the polymeric material produced by a precursor material for the polymeric material.

The details of one or more embodiments of the invention are set forth in the accompanying drawings and the description below. Other features, objects, and advantages of the invention will be apparent from the description and drawings, and from the claims.

DETAILED DESCRIPTION OF THE DRAWINGS

DETAILED DESCRIPTION OF THE INVENTION

The methods of the present disclosure provide for the manufacture of cutting edge structures (e.g., razor blades which may be used in shaving devices or razors). Specifically, disclosed are methods for manufacturing cutting edges or razor blades for shaving devices from polymeric material.

As used herein, a polymeric material signifies a material that is formed of a polymer, the latter being a large, chain-like molecule made up of monomers, which are small molecules. Generally, a polymer can be naturally occurring or synthetic. In the present invention, preferred embodiments comprise synthetic or semi-synthetic polymers. The synthetic or semi-synthetic polymer materials generally can occur in two forms or states. The first state may be a soft or fluid state and the second state may be a hard or solid state. Generally synthetic polymers are molded or extruded when in the first state (e.g., liquid or soft) and subsequently formed into an object that is in a second state (e.g., hard or solid). In some instances, the material is reversible (e.g., a material in the second state can be converted back to its first state) while in others, the polymerization is irreversible (e.g., the material cannot be converted back to its first state).

A thermoplastic polymer is a type of reversible polymer that is in a soft or liquid first state at elevated temperatures (e.g. 200° C. and above) and converts to a solid second state when cooled to ambient temperatures. Thermoplastic polymers are typically used for injection molding or extrusion techniques of the prior art.

For those polymeric materials where the second state is obtained from the first state via irreversible polymerization, the first state of the polymeric material may generally be thought of as being a "precursor" for the second state of the polymeric material. As such, in the present invention, a polymeric material may be generated from a precursor material or a material in a first state.

The materials that are generally desired for the present invention cutting edge structures are materials in the first, soft or liquid, states which comprise monomers or short chain length (e.g., low molecular weight) polymers known as oligomers or both. Both monomers and oligomers are referred to herein as "precursors." These precursors are converted into long chain length polymeric material in the second, solid state through a polymerization or cross-linking process, herein referred to as a curing process. Curing the precursor material can generally be achieved under the influence of heat, light, ionic or high energy radiation, or any combination thereof. After curing, the solid polymeric material is achieved.

Figure 1:
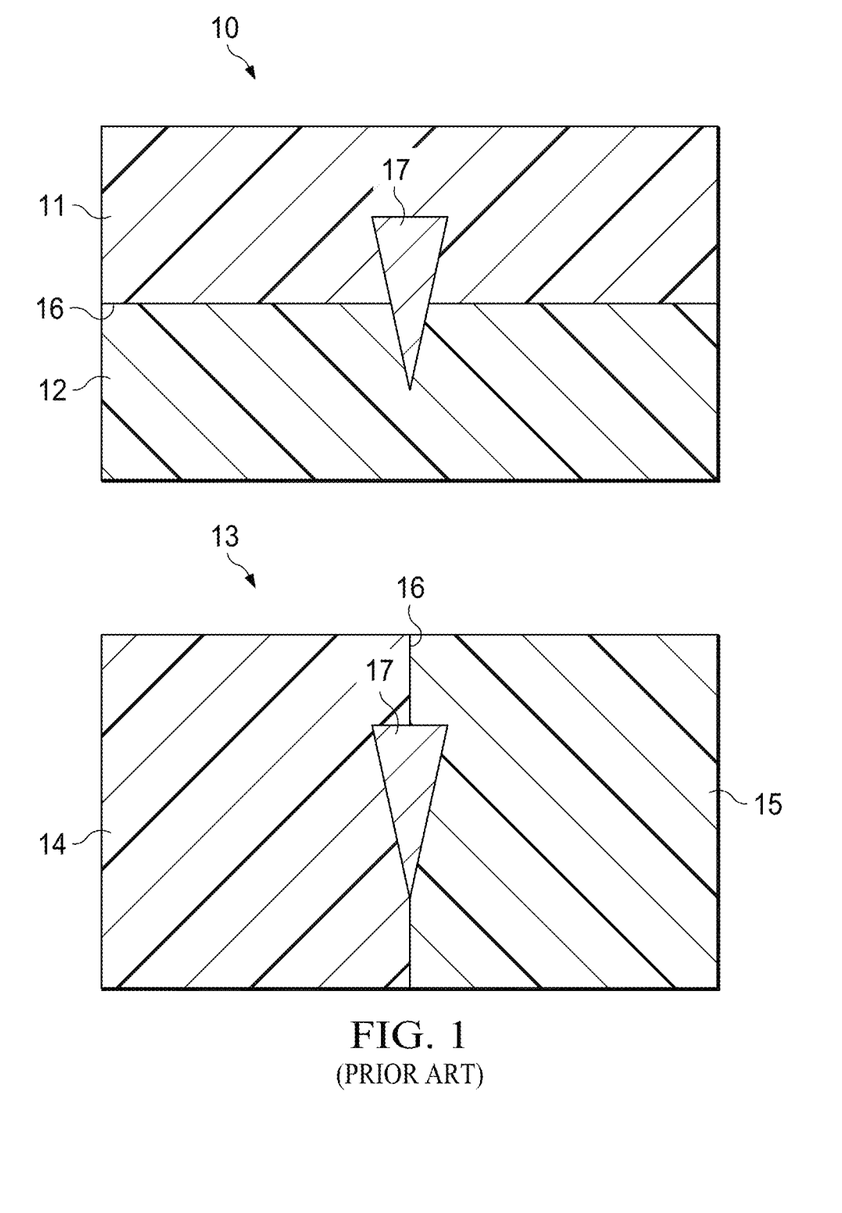
FIG. 1 depicts cross-sectional views of base structures of the prior art.

FIG. 1 depicts cross-sectional views of base structures of the prior art. In one prior art embodiment, a base structure 10 is shown having two parts, an upper portion 11 and a lower portion 12, while in another prior art embodiment, a base structure 13 is shown having a left portion 14 and a right portion 15. Between the mating surfaces or interface 16 of each prior art base structure is where a cutting edge structure 17 may be formed. It should be noted that the base structure material of the prior art is generally machined out of metal. In both base structures 10 and 13, in order for the cutting edge structure 17 to be formed, both portions of each base structure, respectively, have to be present in the base structure and have to be joined firmly together. The base structure is, in effect, a closed system only having one or more small fluid channels for the liquid polymer to be injected. Further, in both base structures 10 and 13, after injecting and solidifying the polymer, the base structure has to be opened or split apart in order to remove the cutting edge structure 17.

Figure 2A:
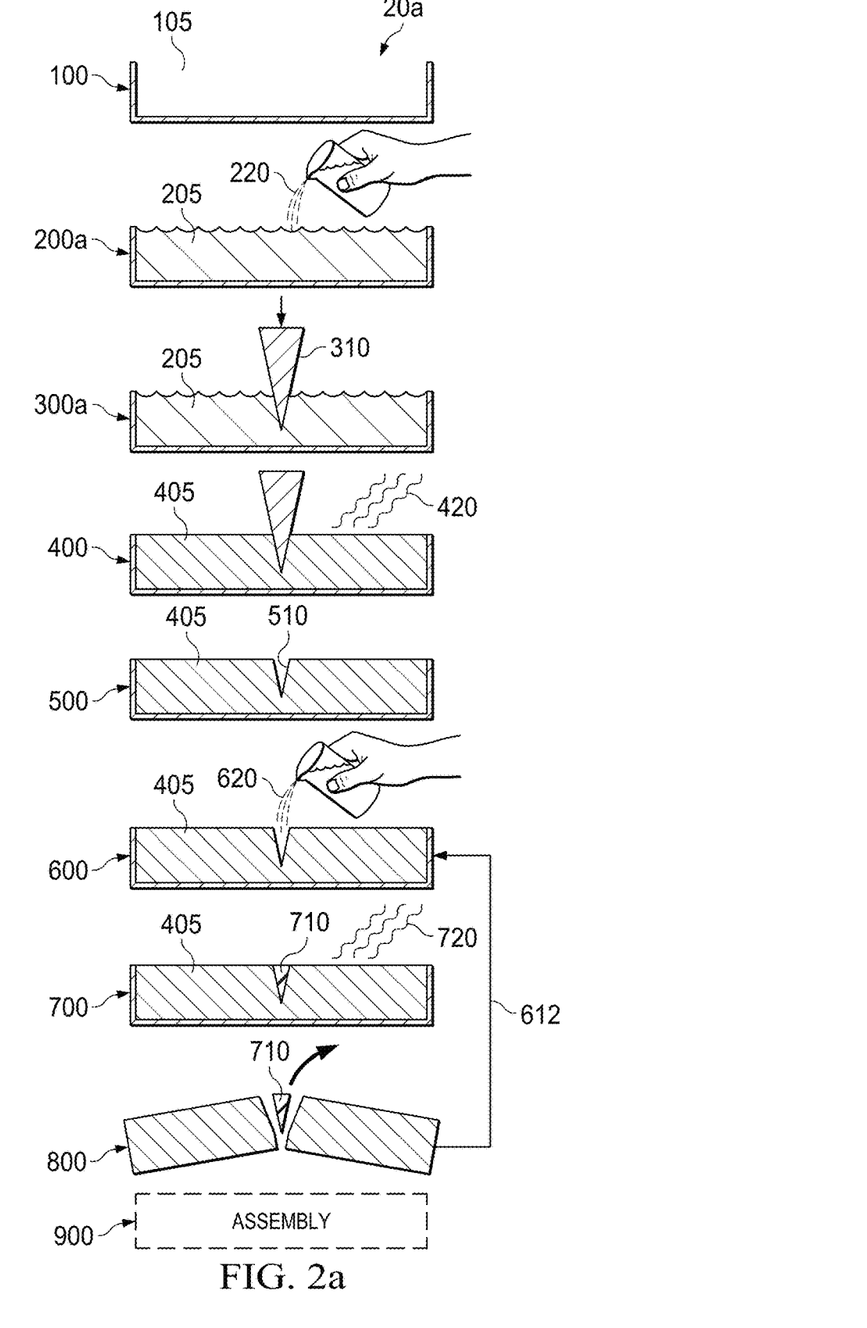
FIGS. 2a and 2b are flow diagrams of methods of manufacturing razor blades from polymer, according to a preferred embodiment of the present invention.

In FIG. 2a, a flow diagram 20a of a method of manufacturing razor blades from one or more polymeric materials according to a preferred embodiment of the present invention is illustrated. At step 100 a container 105 is provided. The container may be of any type, shape or size, but is preferably selected to produce the appropriate base structure 405 in which to form cutting edge structures such as razor blades. There is also no limitation with respect to the dimensions of the base structure (e.g., height, length) though desirably the base structure may have a height of at least about 5 mm and a length of at least about 30 mm.

Generally, it is desired that the first polymeric material 220 of the present invention used to form the base structure 405 has a first uncured fluid state, so that it can be dispensed into the container 105 at step 200a. There is generally no limitation to the types of first polymeric material that can be used to form the base structure 405. In a preferred embodiment, the first polymeric material and related precursors are Poly (methyl methacrylate) (PMMA), Polydimethylsiloxane (PDMS), or other materials commonly used for micro-replication or nano-imprint lithography, and as such, the first polymeric material 220 of step 200a is preferably comprised of SYLGARD® 184 from Dow Corning. The viscosity of SYLGARD® is about 5100 centiPoise. The container 105 may be kept or removed at the end of the process as will be described below.

It should be noted that the base structure 405 can be considered to be a portion of a mold that will form the cutting edge structure (e.g., razor blade). In the flow diagram 20a of the present invention, the base structure 405 effectively represents a single part mold which cannot generally be split into further parts. The base structure 405 can be considered to be a half of a typical mold (e.g., the bottom half) since the other (e.g., upper half) half is not a component of the present invention. This contrasts the base structures of the prior art shown in FIG. 1 by having only a single part mold or one half of a mold, the issues of "flashing" found in two part molds found in the prior art melt flow processing are avoided.

Figure 3:
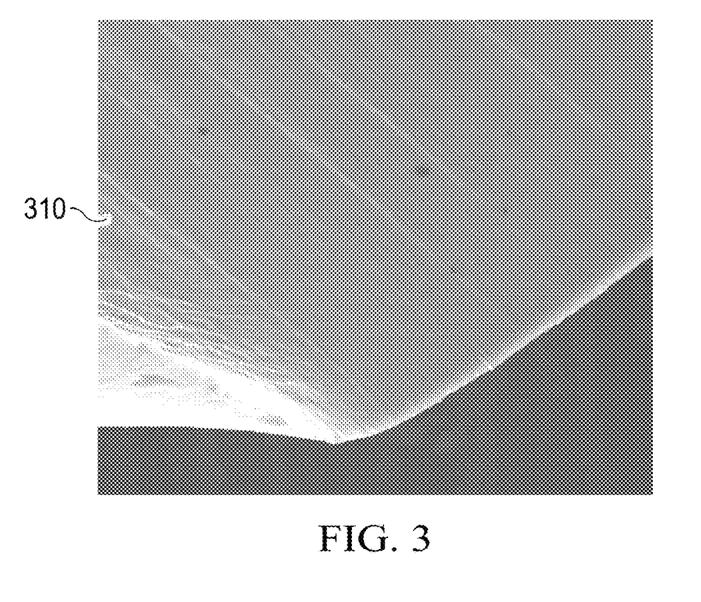
FIG. 3 is a micrograph of a steel blade used as a cutting edge template in FIGS. 2a and 2b according to the present invention.
Figure 10:
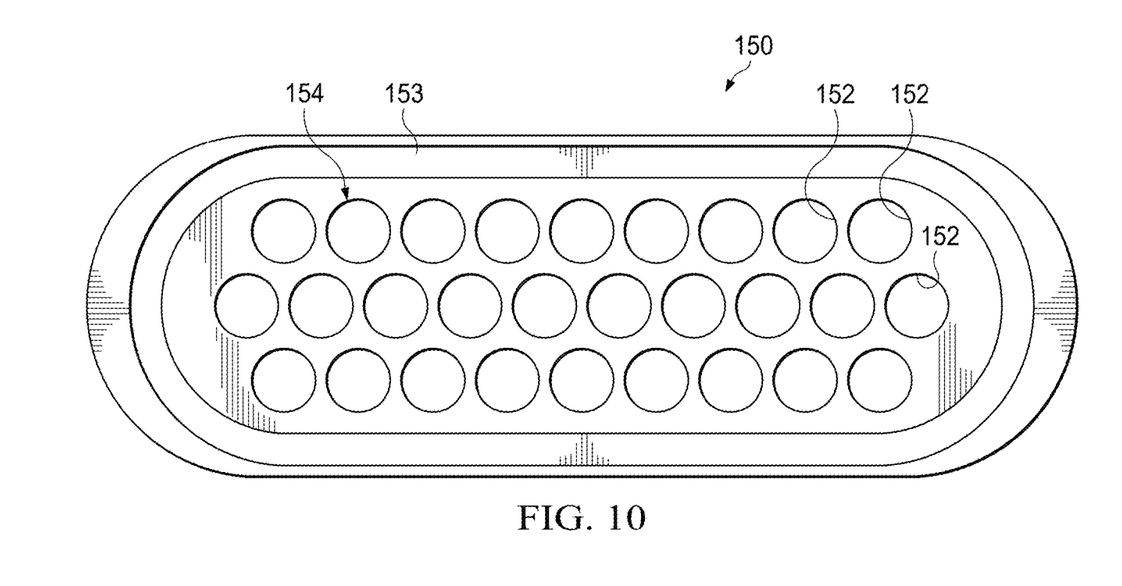
FIG. 10 is a perspective view of a structure having a plurality of non-linear cutting edges formed therein according to a still further embodiment of the present invention.
Figure 11:
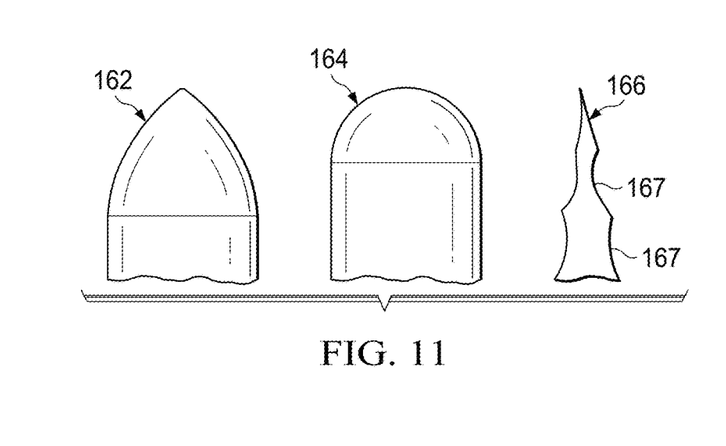
FIG. 11 depicts various profiles of present invention cutting edge structures.

A cutting edge template 310 is inserted into the liquid first polymeric material 205 at step 300a. The cutting edge template 310 may be of any type desired, but is generally preferably a three-dimensional stainless steel blade of the type shown in FIG. 3. The cutting edge template 310 may also be comprised of silicon, sapphire or diamond. The template 310, regardless of material composition, may have any shape or profile feasible for a cutting edge. For instance, the shape of the template, and in turn, the final cutting edge structure shape, may be straight, curved, ellipsoidal, notched or toothed, or with internal openings including as many bevels and facets as desired to be present in the resultant polymeric blade. Several shapes or profiles capable of being formed in the present invention are shown in FIGS. 10 and 11.

After the cutting edge template 310 is inserted into the first polymeric material and while the template 310 is disposed in the first polymeric material 205 at step 300a, the first polymeric material 205 is polymerized at step 400 such that the liquid first polymeric material 205 becomes a solid polymeric material, thereby forming the base structure 405. For example, if the first polymeric material 205 is comprised of PDMS, the PDMS is heated so as to become cured or polymerized. PDMS typically cures or solidifies through a chemical reaction involving water (e.g., absorbing water from the air) which is not reversible. While the process to fully cure the material may generally be a relatively slow process, it can preferably be accelerated with heat 420.

Figure 2B:
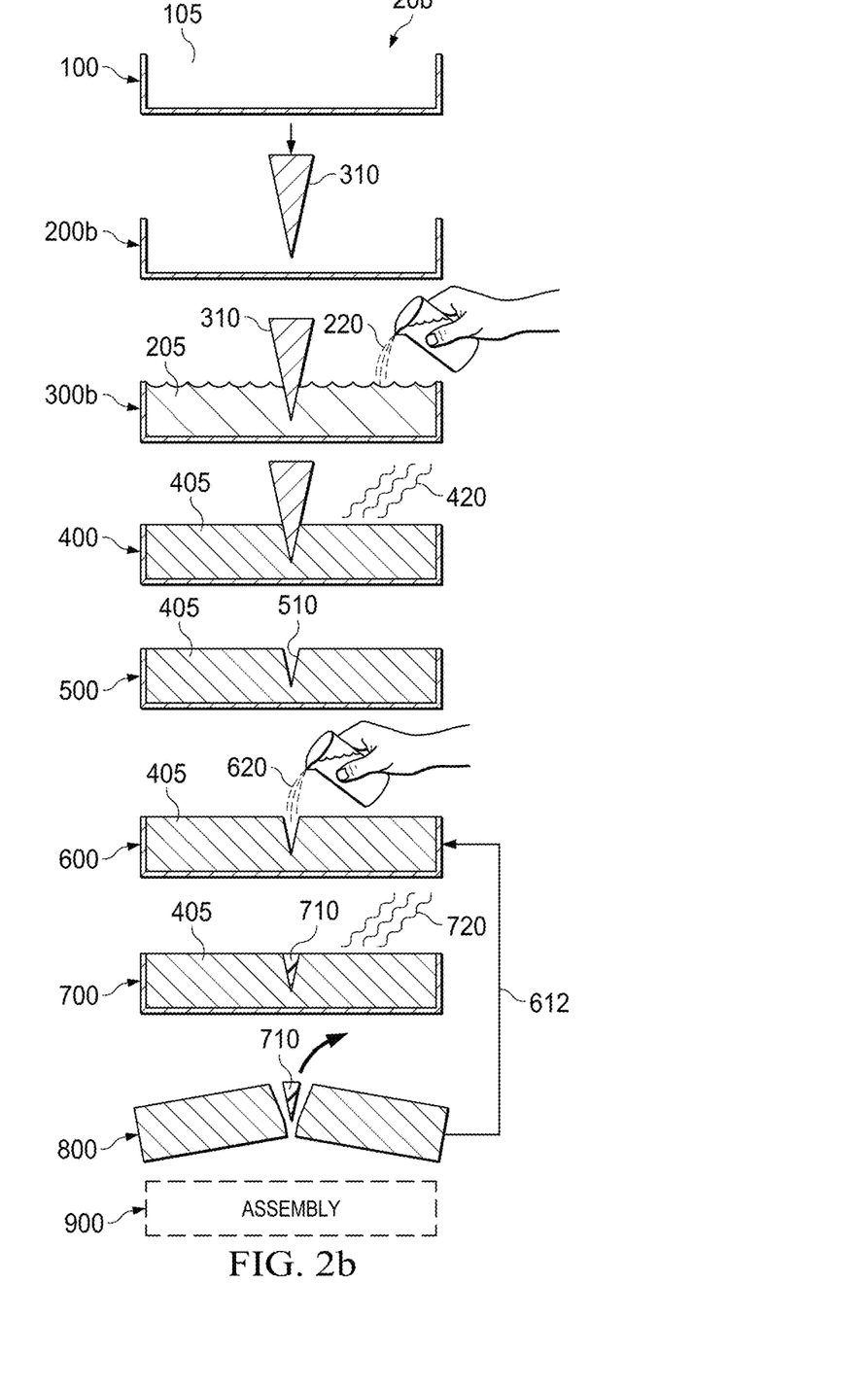

FIG. 2b depicts an alternate process flow 20b of the present invention wherein at step 200b, the cutting edge template 310 is inserted into the container 105 prior to a first liquid polymeric material 220 being disposed in the container. As above, the cutting edge template 310 may be of any type desired, but is generally preferably a three-dimensional stainless steel blade of the type shown in FIG. 3. The cutting edge template 310 may also be comprised of silicon, sapphire or diamond. The template 310, regardless of material composition, may have any shape or profile feasible for a cutting edge. For instance, the shape of the template, and in turn, the final cutting edge structure shape, may be straight, curved, ellipsoidal, notched or toothed, or with internal openings including as many bevels and facets as desired to be present in the resultant polymeric blade. Several shapes or profiles capable of being formed in the present invention are shown in FIGS. 10 and 11.

At step 300b in FIG. 2b, the first polymeric material 205 selected to produce the base structure 405 is preferable in a first uncured fluid state 220, so that it can be disposed in the container 105 and around the cutting edge template 310 as shown in step 300b. There is generally no limitation to the types of first polymeric material that can be used to form the base structure 405. In a preferred embodiment, the first polymeric material and related precursors are Poly (methyl methacrylate) (PMMA), Polydimethylsiloxane (PDMS), or other materials commonly used for micro-replication or nano-imprint lithography, and as such, the first polymeric material 220 of step 300b is preferably comprised of SYLGARD® 184 from Dow Corning. The viscosity of SYLGARD® is about 5100 centiPoise. The container 105 may be kept or removed at the end of the process as will be described below.

The base structure 405 can be considered to be a portion of a mold that will form the cutting edge structure (e.g., razor blade). As with flow diagram 20a of FIG. 2a, in the flow diagram 20b of the present invention, the base structure 405 effectively represents a single part mold which cannot generally be split into further parts. The base structure 405 can be considered to be a half of a typical mold (e.g., the bottom half) since the other (e.g., upper half) half is not a component of the present invention. This contrasts the base structures of the prior art shown in FIG. 1 by having only a single part mold or one half of a mold, the issues of "flashing" found in two part molds found in the prior art melt flow processing are avoided.

Figure 4:
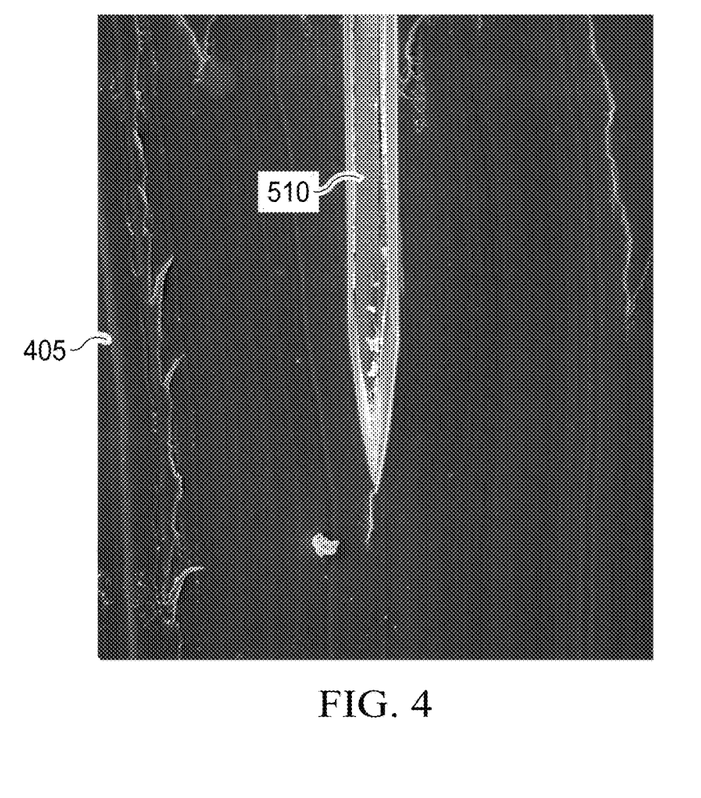
FIG. 4 is a micrograph of a cross-sectional view of a cavity according to the present invention.

It should be noted that the process steps beyond step 300a in FIG. 2a and step 300b in FIG. 2b are essentially the same. As such, after either of step 300a or 300b, both processes 20a and 20b may continue to step 400, where the cutting edge template 310 is removed from the base structure 405 that was formed, revealing a cavity 510 in the base structure 405. The duration of step 400 (curing of first polymeric material) may be about 48 hours at 25 degrees. The cavity 510 has the shape of the razor blade with desired tip radius (e.g., less than 1 μm). A micrograph of a cross-sectional view of a cavity 510 as formed in step 500 using a PDMS base structure 405 of the present invention is shown in FIG. 4.

It should be noted that, as shown in FIGS. 2a and 2b, the cavity is a single part created by replication of a template of a cutting edge. As noted above, by comprising only a single part mold or one half of a mold, the issues of "flashing" found at the interface of two part molds in the prior art melt flow processing are avoided.

As shown in step 600, the cavity 510 formed in the base structure 405 made from a first polymeric material 220 is filled with a second polymeric material 620, generally in a form of a precursor for the second polymer. A precursor in the present invention may preferably be a monomer or a short chain length or low molecular weight oligomer material.

Desirably the filling or pouring step 600 of the present invention occurs at ambient temperature ranging from about 10 degrees Celsius to about 40 degrees Celsius or may be heated up to 100 degrees Celsius to further reduce its viscosity. While generally there is no limitation to the types of second polymeric materials that can be used to fill the cavity, it is desirable that the polymeric precursor be more fluid and less viscous at ambient or near ambient temperatures than polymeric materials used in melt flow processing in order to achieve full penetration of the material in the cavity 510 and to fill the cavity 510 with a shape of a razor blade and tip desired. As such, a preferred viscosity of the second polymeric material precursor of the present invention is less than about 10000 centiPoise, more preferably less than about 5000 centiPoise, and most preferably about 3000 centiPoise or less.

In the present invention, the second precursor material is preferably an acrylic based material, more preferably a polymer with monomer or oligomer formulations such as Femtobond 4B, and most preferably polymeric materials from the ORMOCER® family, such as ORMOCORE, supplied by Microresist Technology GmbH. The ORMOCORE material has a viscosity of about 2900 centiPoise at ambient temperature. Another material named E-SHELL® 300 which may be used as a precursor has a viscosity of about 340 centiPoise. The precursor material has a viscosity that is lower than the viscosity of the base structure or first polymeric material. It is noted in the present invention that a non-polymerized material, such as ORMOCORE, may be heated, up to 100 degrees Celsius to further reduce the viscosity. Generally, heating above 100 degrees Celsius may undesirably result in shrinkage when cooling down the cured structure.

Alternatively, epoxy based materials, such as SU8 supplied by MicroChem, with a range of viscosities from 2.5 to 1250 centiPoise can be utilized as the second polymeric material.

A photo-initiator of about 1 to about 3% by weight of composition may be added to the second polymeric material prior to the curing step 700 in FIG. 2a and FIG. 2b. Photo-initiators generally start the polymerization or cross-linking (e.g., curing) process of the precursor of a polymeric material by absorbing radiation, commonly visible or UV light, and creating radicals that react with the monomers or oligomers and link them together. A photo-initiator commonly used with acrylate based precursors is alpha hydroxy ketone, sold under the trade name of IRGACURE®184 by BASF. In the case of ORMOCORE, a photo-initiator may be IRGACURE®369 also by BASF.

The curing of the second polymeric material 620 to create a solid polymer 710 is performed at step 700 in FIG. 2a and FIG. 2b. The curing process may be comprised of or mediated by heat or light 720 though more preferably the curing process of the present invention is light. The temperature for curing may be any temperature, including preferably ambient or room temperature. Desirably the curing process of the present invention occurs at ambient temperature ranging from about 10 degrees Celsius to about 40 degrees Celsius or may be heated up to 100 degrees Celsius to further reduce its viscosity. Generally, the higher the temperature applied, the faster the curing or hardening of the material occurs. Curing of the precursor (e.g., the monomer or oligomer to create a solid polymer) may involve polymerization, i.e., molecular chain formation or cross-linking of existing molecular chains or both. Curing of the present invention is carried out preferably by exposing the precursor or second polymeric material 620 to electromagnetic radiation, e.g., UV light. The wavelength of the electromagnetic radiation may range from about 250 nanometers to 1500 nanometers, and preferably from about 400 nanometers to about 1100 nanometers. If a photo-initiator is used, the polymeric material is transparent at a specific wavelength in this range, optimally chosen for the used photo-initiator. Hence, the precursor and the cured solid polymer of the second polymeric material present invention and/or at least one side of the cavity generally need to be at least partially transparent for the wavelength of the electromagnetic radiation to be effective. The transparency selection of the polymer is necessary for effectiveness as curing or polymerization of the whole object (e.g., cutting edge structure) generally cannot occur when using light if the light cannot penetrate below the surface of the polymer. While light curing is preferred to avoid shrinkage, heat may also produce generally about the same results as those with light. This step avoids expansion, shrinkage or distortion of the material and forms a cutting edge structure 710 from the second polymeric material 620. The duration of the curing at step 700 can range from about one or more minutes to about an hour and this may likely depend on variables such as laser power, temperature, thickness of the second polymeric material, and other factors.

In a preferred embodiment, the first polymeric material 220 and related precursors that form the base structure 405 are Poly (methyl methacrylate) (PMMA) or Polydimethylsiloxane PDMS). The material to form the base structure is preferably compliant, signifying that the material is flexible or deformable, so that the replicated cutting structure 710 formed from the second material, such as ORMOCORE or Femtobond 4B or SUB, can be easily removed from the base structure 405 after curing. With a PDMS-formed base structure 405, the elasticity and low surface energy properties of the PDMS material allow desirable removal of the cutting edge template 310. The elasticity provides deformation of the base structure 405 to release the cutting edge template 310 while also allowing the base structure 405 to return to its original shape after the cutting edge template 310 is removed. The low surface energy of the PDMS material prevents sticking of the cutting edge template 310 to the base structure 405 and also prevents damage to the base structure 405 during removal. Having these two properties, the base structure material plays an advantageous role in assisting the removal of the cutting edge template.

At step 800, the base structure 405 is removed from the cutting edge structure 810. The base structure can be removed by physical or chemical means. A physical removal may include bending the base structure 405 apart and away from the cutting edge structure 810. If the base structure is removed by physical means, the container 105 may need to be first separated from the base structure. In some cases, the base structure 405 may have a rubbery attribute making a physical removal between the base structure and cutting edge structure and/or the container 105 feasible. A chemical removal process may include dissolving the base structure 405. If the base structure is dissolved then the container 105 may remain. The type of chemistry for dissolving the base structure may include organic solvents and if made from PMMA may include solvents such as acetone, acetonitrile, 1,2-dichloroethane, and dichlorobenzene, and if made from PDMA, may include solvents such as solution of TBAF (tetrabutylammonium fluoride) in NMP (N-Methylpyrrolidinone) or in DMF (dimethylformamide) or in THF (tetrahydrofuran) or in PMA (propylene glycol methyl ether acetate) or any combination thereof.

The removal process may be achieved by dissolving, wet etching (e.g., via a chemical solution), melting, or any combination thereof.

The cutting edge structure 810 represents the structure in the shape of a final cutting edge or razor blade edge.

Flashing has been avoided with the present invention process since the base structure of the present invention is capable of forming the polymeric blade within one portion of the base structure as the base structure is formed of one part as opposed to the two mating parts or halves of the prior art (FIG. 1).

Figure 5:
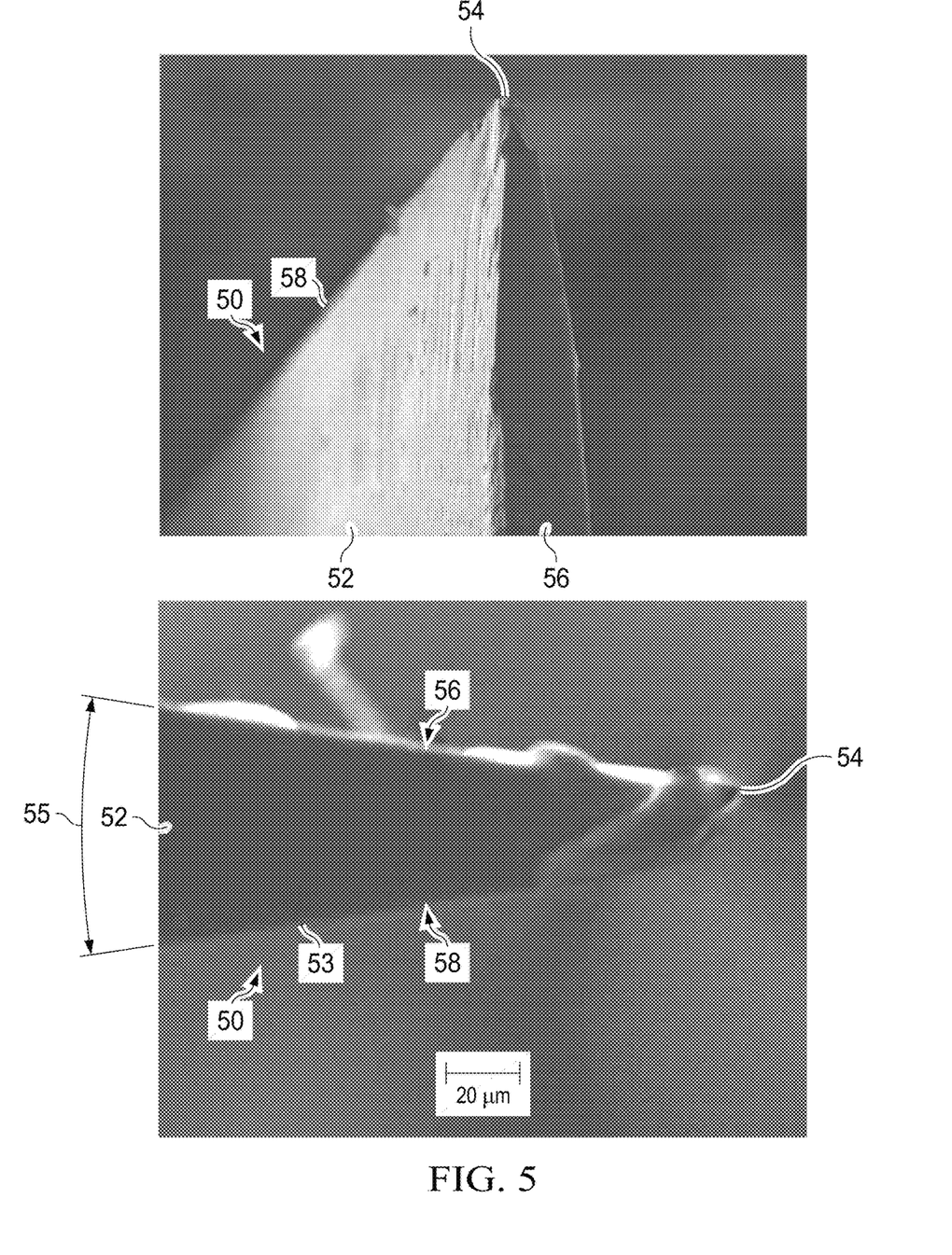
FIG. 5 is a micrograph of a replicated blade made according to the present invention.

In FIG. 5 micrograph views are shown of actual released cutting edge structures manufactured in accordance with the methods of manufacturing described herein. The replicated cutting edge structure or blade edge is made from ORMO-CORE (the second polymeric material) removed from a PDMS (the first polymeric material base structure) mold using the process of the present invention.

The tip radius of the cutting edge structure produced by the present invention process is desirably in the range of less than about 1 micrometer. The hardness of a polymeric cutting edge structure formed, such as with ORMOCER®, may reach near 100 MPa after curing. In the case of SUB, the cutting edge structure may be pyrolised after removing it from the base structure in step 800 of FIG. 2a and FIG. 2b, to further increase the hardness. As polymerized SU8 has a hardness of about 180 MPa and pyrolised SU8 has a hardness of about 1 GPa.

As shown in FIG. 5, the razor blade 50 formed using the process of FIG. 2a and FIG. 2b includes a polymeric body portion or substrate 52 with a wedge-shaped sharp edge having a tip 54. The tip 54 has a blade edge 53 having about a 15 degree included blade angle 55, as shown in FIG. 5. Facets 56 and 58 diverge from the tip 54.

While a conventional razor blade wedge profile is shown in FIG. 5, the present invention contemplates cutting edge structures with any number of facets, e.g., more than 2 or 3, and these facets need not be planar. Several exemplary shapes of the present invention are shown below in FIGS. 10 and 11 though any desirable, feasible shape is contemplated in the present invention.

It should be noted that the base structure 405 of FIG. 2a and FIG. 2b, if not dissolved or melted at step 800 to remove the cutting edge structure, may be used over again to form additional cutting edge structures. The number of times the base structure may be used may be limited depending on the type of first polymeric material utilized for the base structure and the robustness of the base structure after each use. Arrow 612 which returns back to step 600 of FIG. 2a and FIG. 2b depicts the re-use of the base structure.

Once free from the base structure, each cutting edge structure that is produced can generally be assembled individually into a razor cartridge. For example, one or more polymer razor blades may be adhered to blade supports (e.g., with glue, ultrasonic welding) and assembled into razor cartridge housings. Once removed from the base structure, the blades can then be processed or coated if necessary and assembled into a razor cartridge at step 900 of FIG. 2a and FIG. 2b.

Figure 6:
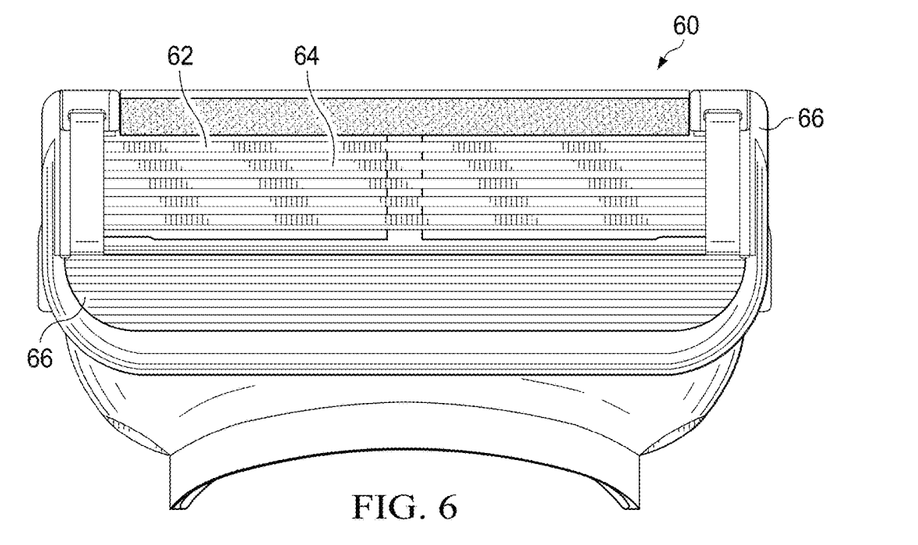
FIG. 6 is a front view of a razor cartridge having polymer razor blades according to one embodiment of the present invention.

A razor cartridge 60 having one or more cutting edge structures or razor blades 62 made of polymer 64 of the present invention can be assembled as shown in FIG. 6. Razor cartridge 60 is similar to razor cartridges that are commercially available utilizing steel blades and with plastic housing and frame components 66. In assembly step 900, the polymeric razor blades 62 can be secured to a mounting assembly prior to being inserted into the frame 66 or housing or they may be mounted directly on the frame.

While the methods of manufacturing described herein have been referred to with primary reference to a single cutting edge structure (e.g., razor blade), the methods are easily applicable to the manufacture of multiple cutting edge structures simultaneously.

Figure 7:
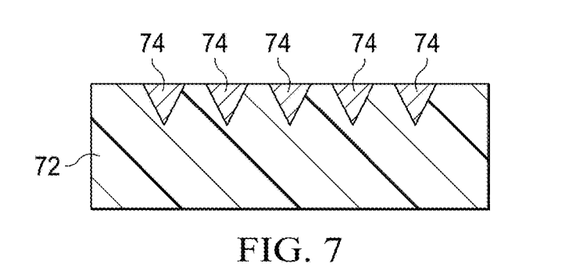
FIG. 7 is a cross-sectional view of an alternate embodiment of the present invention depicting five cavities in a base structure.

In FIG. 7, a base structure 72 having a plurality of cavities 74 (e.g., five cavities) produced in accordance with the methods described herein is illustrated. Manufacture of the plurality of cutting edge structure (e.g., razor blades) follows the process of FIG. 2a and FIG. 2b but includes one or more cutting edge templates (not shown) being pressed into the base structure at the same time (if more than one) or in sequence (if only one). After such a "batch" manufacture of the plurality of cutting edge structures such as razor blades on the base structure, the cutting edge structures may be separated as described above in conjunction with FIG. 2a and FIG. 2b in preparation for further assembly into razor cartridges. It should be noted that the base structure 72 size, depending on the size of the cutting edge structures desired, may be larger than the base structure 405 of FIG. 2a and FIG. 2b.

Figure 8:
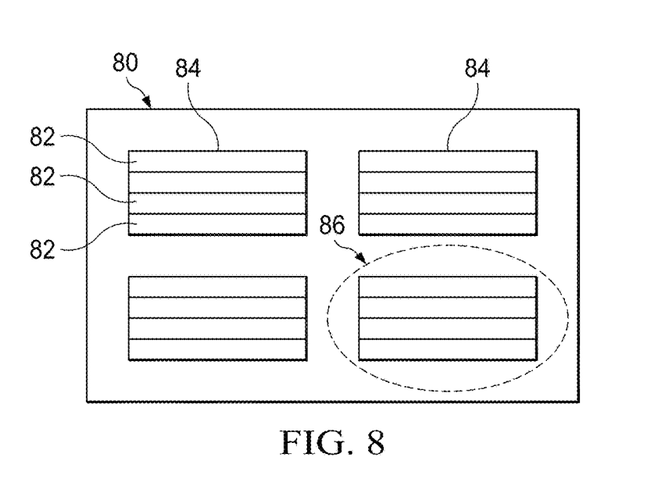
FIG. 8 is a top view of a plurality of blade boxes in a base structure, each having a plurality of blades and a frame in another embodiment of the present invention.
Figure 9:
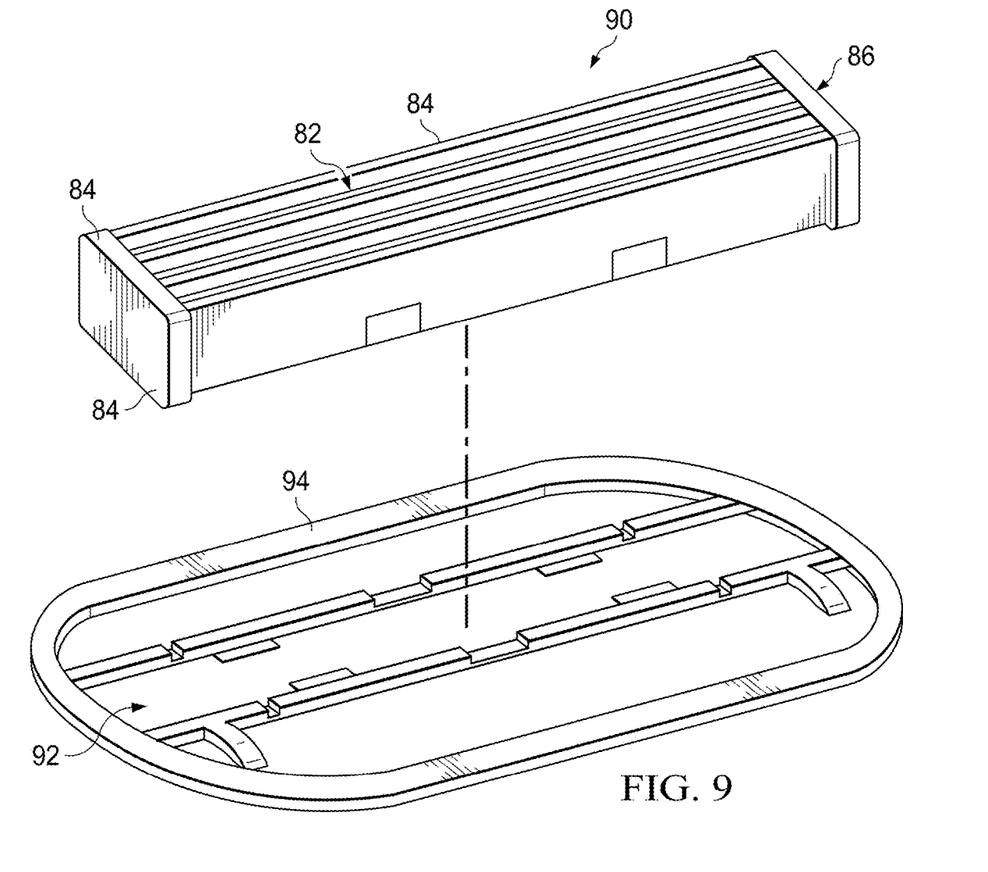
FIG. 9 is a top view of a blade box for insertion into a razor cartridge in accordance with the present invention.

Turning to FIG. 8, a plurality of razor blades 82 may be formed clustered together in groups of three blades with a small frame 84. The frame is a non-cutting edge structure while the razor blades are cutting edge structures. The clusters have a generally rectangular shape and for ease in discussion are referred to herein as blade boxes 86. The plurality of razor blades 82 can be manufactured in this clustered organization to reduce downstream process steps in the shaving razor system assembly. The blade boxes 86 have 3 individual razor blades 82, as illustrated, enclosed by a frame 84. The blade boxes 86 can be manufactured identically or they can be different, such as each box having differences in blade spacing, included blade angles, number of blades, orientation of the blades, and the like. The differences can be made via changes to the various method steps described above, such as utilizing different templates and pressing in different orientations, and the like. A blade box 86 can be removed from the base structure in the same manner as described above, but such that the self-contained blade box 86 is a singular unitary part. In FIG. 9, a blade box 86 is inserted into an opening 92 in the housing 94 of a razor cartridge 90 and secured therein or be formed into a razor cartridge entirely at the outset (not shown).

Assembling the razor cartridge in such a manner eliminates the somewhat time consuming or difficult steps of affixing each individual razor blade to a blade support or to a housing, inserting each blade support-razor blade pair or each blade in the razor cartridge housing, and aligning each separate razor blade to the desired blade height, angle, and spacing. By utilizing the method described herein, the plurality of razor blades are aligned and secured in the blade box, thereby eliminating the need to affix individual blade supports and the difficult process of aligning 3 or more separate razor blades into the razor cartridge housing. While FIGS. 8 and 9 illustrate blade boxes 86 having 3 razor blades, it is to be understood that any number of razor blades can be clustered or formed together, such as 2, 4, 5, or more.

While the blades illustrated in the figures thus far have generally linear blade edges, other blade shapes and edge patterns can be produced by the methods described herein.

To that end, in a still further alternative embodiment, different cutting structures in addition to straight edged or wedge-shaped configuration for blade edges are also contemplated in the present invention.

These other shapes are produced by using a cutting edge template in step 300a/200b that comprises a different profile. In some instances, a sheet of material or a frame 153 with openings 154 that contain internal cutting edges 152 that are non-linear as shown in the blade box 150 of FIG. 10 is used. In this embodiment of the present invention, the sheet 153 may be disposed into the base structure preferably using the process of FIG. 2a and FIG. 2b.

Any number of shapes or profiles for the cutting edge template, and hence, for the cutting edge structure or structures that will be formed, is contemplated in the present invention. The present invention includes, but is not limited to, the additional illustrative embodiments depicted in FIG. 11. Two arched cutting edge profiles, e.g., a gothic arch profile 162, a roman arch profile 164 are shown in FIG. 11 though any other feasible shape of the cutting edge structure is encompassed by the present invention (e.g., wavy, serrations, saw teeth, etc.). Additionally, a cutting edge profile 166 having one or more undercuts 167 is also shown in FIG. 11.

One of the many advantages of producing razor blades for shaving from polymer in the manner described herein is that resultant cutting edge structures or blade edges formed have very similar surface roughness as the template cutting edge. Thus, when replicating a steel blade, grind marks of the steel template cutting edge are also replicated. Very smooth facet surfaces without grinding marks can be created, if the template is produced from single crystal material such as silicon or sapphire. Accordingly, the resultant cutting edge structure has a similar surface roughness to that of the template cutting edge. A change in the template cutting edge material would change the surface roughness of the resultant cutting edge.

Accordingly, other embodiments are within the scope of the following claims.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for manufacturing at least one cutting edge structure comprising the steps of:
providing a first polymeric material in liquid form in a container;
providing at least one cutting edge template within said first polymeric material;
curing said first polymeric material while said at least one cutting edge template is disposed in said first polymeric material to form a base structure;
removing said template to obtain a cavity in said base structure;
filling said cavity with a second material, said second material being a precursor for a polymeric material;
curing said second material; and
separating said base structure and said cured second polymeric material, said at least one cutting edge structure comprised of said cured second polymeric material,
wherein said at least one cutting edge structure is a razor blade or a portion of a blade box and wherein a tip radius of said at least one cutting edge structure is less than 1 micrometer.

2. The method of claim 1, wherein said second material being said precursor material for said polymeric material is comprised of a monomer material, an oligomer material, or any combination thereof.

3. The method of claim 1, wherein said at least one cutting edge structure comprises a gothic arch, a roman arch, or one or more undercuts.

4. The method of claim 1, wherein said first polymeric material is comprised of Poly (methyl methacrylate) (PMMA) or Polydimethylsiloxane (PDMS).

5. The method of claim 1, wherein said second material being said precursor material for said polymeric material is comprised of an acrylic material or an epoxy material.

6. The method of claim 1, wherein a viscosity of said second material being said precursor material for said polymeric material is less than about 10,000 centiPoise.

7. The method of claim 1, wherein said base structure is comprised of only one part.

8. The method of claim 1, wherein the cavity is entirely comprised in a single part in said base structure.

9. The method of claim 1, wherein a portion of the cavity is not enclosed by said base structure after formation.

10. The method of claim 1, wherein at least one of said second material being said precursor material for said polymeric material, said cured second polymeric material and at least one side of the cavity is transparent to electro-magnetic radiation at a wavelength in the range of 250 to 1500 nanometers.

11. The method of claim 1, wherein the separating step comprises physical or chemical removal of the base structure from said cured second polymeric material cutting edge structure.

12. The method of claim 1, wherein a photo-initiator of about 1 to about 3% by weight of composition is added to the second material being said precursor material for said polymeric material prior to the curing step.

13. The method of claim 1, wherein the first polymeric material is compliant.

14. The method of claim 1 wherein said steps of curing comprise cross-linking or polymerization.

15. The method of claim 1, wherein said steps of curing are mediated by heat, light, or a combination thereof.

16. The method of claim 15, wherein one or both of said curing steps comprise UV light.

17. The method of claim 1, further comprising the step of securing said razor blade or said blade box into a razor cartridge housing or frame.

18. The method of claim 1 wherein said blade box is comprised of different types of cutting edge structures.

* * * * *